United States Patent
Liu et al.

(10) Patent No.: US 12,283,104 B2
(45) Date of Patent: Apr. 22, 2025

(54) METHOD, ELECTRONIC DEVICE, AND COMPUTER PROGRAM PRODUCT FOR EXTRACTING TARGET FRAME

(71) Applicant: Dell Products L.P., Round Rock, TX (US)

(72) Inventors: Zhisong Liu, Shenzhen (CN); Sanping Li, Beijing (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 18/127,416

(22) Filed: Mar. 28, 2023

(65) Prior Publication Data
US 2024/0290095 A1 Aug. 29, 2024

(30) Foreign Application Priority Data
Feb. 28, 2023 (CN) .......................... 202310194565.7

(51) Int. Cl.
*G06F 16/735* (2019.01)
*G06V 10/42* (2022.01)
*G06V 10/82* (2022.01)
*G06V 20/40* (2022.01)

(52) U.S. Cl.
CPC ............ *G06V 20/46* (2022.01); *G06F 16/735* (2019.01); *G06V 10/431* (2022.01); *G06V 10/82* (2022.01); *G06V 20/48* (2022.01)

(58) Field of Classification Search
None
See application file for complete search history.

(56) References Cited

U.S. PATENT DOCUMENTS

| | | | |
|---|---|---|---|
| 2021/0124928 A1* | 4/2021 | Wang | G06T 7/248 |
| 2023/0045726 A1* | 2/2023 | Shu | G06V 10/26 |

OTHER PUBLICATIONS

M. Gygli et al., "Creating Summaries from User Videos," European Conference on Computer Vision, Sep. 2014, pp. 505-520.
R. Laganière et al., "Video Summarization from Spatio-Temporal Features," Proceedings of the 2nd ACM TRECVid Video Summarization Workshop, Oct. 2008, pp. 144-148.

(Continued)

*Primary Examiner* — Idowu O Osifade
(74) *Attorney, Agent, or Firm* — Ryan, Mason & Lewis, LLP (57) ABSTRACT

A method in an illustrative embodiment includes acquiring a first sequence of a set of image frames of a video arranged in positive order. The method further includes generating, based on the first sequence of a positive-order arrangement, a second sequence of the set of image frames arranged in reverse order. The method further includes determining a first cross correlation sequence of the image frames in the first sequence relative to the image frames in the second sequence; determining a second cross correlation sequence of the image frames in the second sequence relative to the image frames in the first sequence; determining, based on the first cross correlation sequence and the second cross correlation sequence, a global feature distribution for the set of image frames; and finally, determining, based on the global feature distribution, at least one target frame in the set of image frames.

20 Claims, 7 Drawing Sheets

(56) References Cited

OTHER PUBLICATIONS

Y.-F. Ma et al., "A User Attention Model for Video Summarization," Proceedings of the Tenth ACM international Conference on Multimedia, Dec. 2002, pp. 533-542.

M. Gygli et al., "Video Summarization by Learning Submodular Mixtures of Objectives," IEEE Conference on Computer Vision and Pattern Recognition (CVPR), Jun. 2015, pp. 3090-3098.

B. Zhao et al., "Quasi Real-Time Summarization for Consumer Videos," IEEE Conference on Computer Vision and Pattern Recognition, Jun. 2014, 8 pages.

D. Potapov et al., "Category-specific Video Summarization," ECCV—European Conference on Computer Vision, Sep. 2014, 16 pages.

K. Zhang et al., "Summary Transfer: Exemplar-based Subset Selection for Video Summarization," 2016 IEEE Conference on Computer Vision and Pattern Recognition (CVPR), Mar. 2016, pp. 1059-1067.

K. Zhang et al., "Video Summarization with Long Short-term Memory," arXiv:1605.08110v2, Jul. 29, 2016, 24 pages.

J. Fajtl et al., "Summarizing Videos with Attention," arXiv:1812.01969v2, Feb. 21, 2019, 16 pages.

Y. Jung et al., "Discriminative Feature Learning for Unsupervised Video Summarization," The Thirty-Third AAAI Conference on Artificial Intelligence, No. 1047, Jan. 2019, pp. 8537-8544.

Y. Song et al., "TVSum: Summarizing Web Videos Using Titles," IEEE Conference on Computer Vision and Pattern Recognition (CVPR), Jun. 2015, pp. 5179-5187.

Cisco, "Cisco Visual Networking Index: Forecast and Trends, 2017-2022" White Paper, https://www.cisco.com/c/en/us/solutions/collateral/service-provider/visual-networking-indexvni/complete-white-paper-c11-481360.html, Feb. 2019, 38 pages.

A. Karpathy et al., "Deep Visual-Semantic Alignments for Generating Image Descriptions," IEEE Conference on Computer Vision and Pattern Recognition, arXiv:1412.2306v2, Apr. 14, 2015, 17 pages.

A. Radford et al., "Learning Transferable Visual Models From Natural Language Supervision," International Conference on Machine Learning, arXiv:2103.00020v1, Feb. 26, 2021, 48 pages.

* cited by examiner

METHOD, ELECTRONIC DEVICE, AND COMPUTER PROGRAM PRODUCT FOR EXTRACTING TARGET FRAME

RELATED APPLICATION

The present application claims priority to Chinese Patent Application No. 202310194565.7, filed Feb. 28, 2023, and entitled "Method, Electronic Device, and Computer Program Product for Extracting Target Frame," which is incorporated by reference herein in its entirety.

FIELD

Embodiments of the present disclosure relate to the field of video processing, and more specifically, relate to a method, an electronic device, and a computer program product for extracting a target frame.

BACKGROUND

Recently, with the popularity of smart phones, personal videos, video lectures, video diaries, video messages on social networks, and videos from many other domains are gradually occupying every scene of life. With the increase of video usage, more and more videos are stored. In this regard, a better video management method is needed. In order to better store a video and quickly understand the summary of the video, one or more small still images called key frames can be extracted from the video, and key frames can convey most of the key information contained in the original video to users.

SUMMARY

Embodiments of the present disclosure provide a solution for extracting a target frame based on video frames arranged in positive order and in reverse order.

In a first aspect of the present disclosure, a method for extracting a target frame is provided. The method includes acquiring a first sequence of a set of image frames of a video arranged in positive order. The method further includes generating, based on the first sequence of a positive-order arrangement, a second sequence of the set of image frames arranged in reverse order. The method further includes determining a first cross correlation sequence of the image frames arranged in positive order in the first sequence relative to the image frames arranged in reverse order in the second sequence. The method further includes determining a second cross correlation sequence of the image frames arranged in reverse order in the second sequence relative to the image frames arranged in positive order in the first sequence. The method further includes determining, based on the first cross correlation sequence and the second cross correlation sequence, a global feature distribution for the set of image frames. Finally, the method further includes determining, based on the global feature distribution, at least one target frame in the set of image frames.

In a second aspect of the present disclosure, an electronic device is provided. The electronic device includes a processor and a memory coupled to the processor. The memory has instructions stored therein, and the instructions, when executed by the processor, cause the electronic device to perform actions. The actions include acquiring a first sequence of a set of image frames of a video arranged in positive order. The actions include generating, based on the first sequence of a positive-order arrangement, a second sequence of the set of image frames arranged in reverse order. The actions further include determining a first cross correlation sequence of the image frames arranged in positive order in the first sequence relative to the image frames arranged in reverse order in the second sequence. The actions further include determining a second cross correlation sequence of the image frames arranged in reverse order in the second sequence relative to the image frames arranged in positive order in the first sequence. The actions further include determining, based on the first cross correlation sequence and the second cross correlation sequence, a global feature distribution for the set of image frames. The actions further include determining, based on the global feature distribution, at least one target frame in the set of image frames.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of exemplary embodiments of the present disclosure with reference to the accompanying drawings, the above and other objectives, features, and advantages of the present disclosure will become more apparent, wherein identical reference numerals generally represent identical components in the exemplary embodiments of the present disclosure. In the accompanying drawings.

DETAILED DESCRIPTION

Principles of the present disclosure will be described below with reference to several example embodiments illustrated in the accompanying drawings. Although the drawings show illustrative embodiments of the present disclosure, it should be understood that these embodiments are merely described to enable those skilled in the art to better understand and further implement the present disclosure, and not to limit the scope of the present disclosure in any way.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As discussed above, when managing a video, it is necessary to extract key frames or target frames to provide key information for the video.

Conventionally, an image frame of a video can be extracted as a key frame in the video, and a classification feature can be obtained based on feature extraction of the image frame. The classification feature can be used to label and classify the video. Alternatively, multiple image key frames can be extracted from the video, and the post-fusion technology can be used to process them to obtain corresponding classification features for classification. For example, a frame can be extracted at each of certain designated times, and the extracted frame can be used as the key for splicing, providing users with information about all parts of the entire video.

However, in a conventional solution, in a case of extracting one image frame as a key frame, a single key frame cannot represent the content of the entire video in most cases, which will result in information loss and insufficient display of the key information of the video. However, in a case of extracting frames at fixed time intervals, the processing of videos with different time lengths is relatively cumbersome, which cannot meet the high efficiency requirements of feature extraction for videos with indefinite time lengths. Meanwhile, because the interval of the extracted frames is fixed, it may also lead to missing some key information.

In view of this, embodiments of the present disclosure provide a solution for extracting a target frame so as to solve one or more of the above problems and other potential problems. In the solution, a set of image frames arranged in positive order and a set of image frames arranged in reverse order of a video are acquired. Then, according to an arrangement order of the image frames, a cross correlation of image frames arranged in positive order relative to image frames arranged in reverse order is determined, and a cross correlation of image frames arranged in reverse order relative to image frames arranged in positive order is determined. A global feature vector is obtained based on the obtained cross correlation, so as to determine at least one target frame as a summary of the video. In this way, by means of determining the cross correlation between a set of image frames arranged in positive order and a set of image frames arranged in reverse order, a correlation between two image frames that are far away from each other in the video can be obtained, so as to improve the accuracy of key frame extraction.

Figure 1:
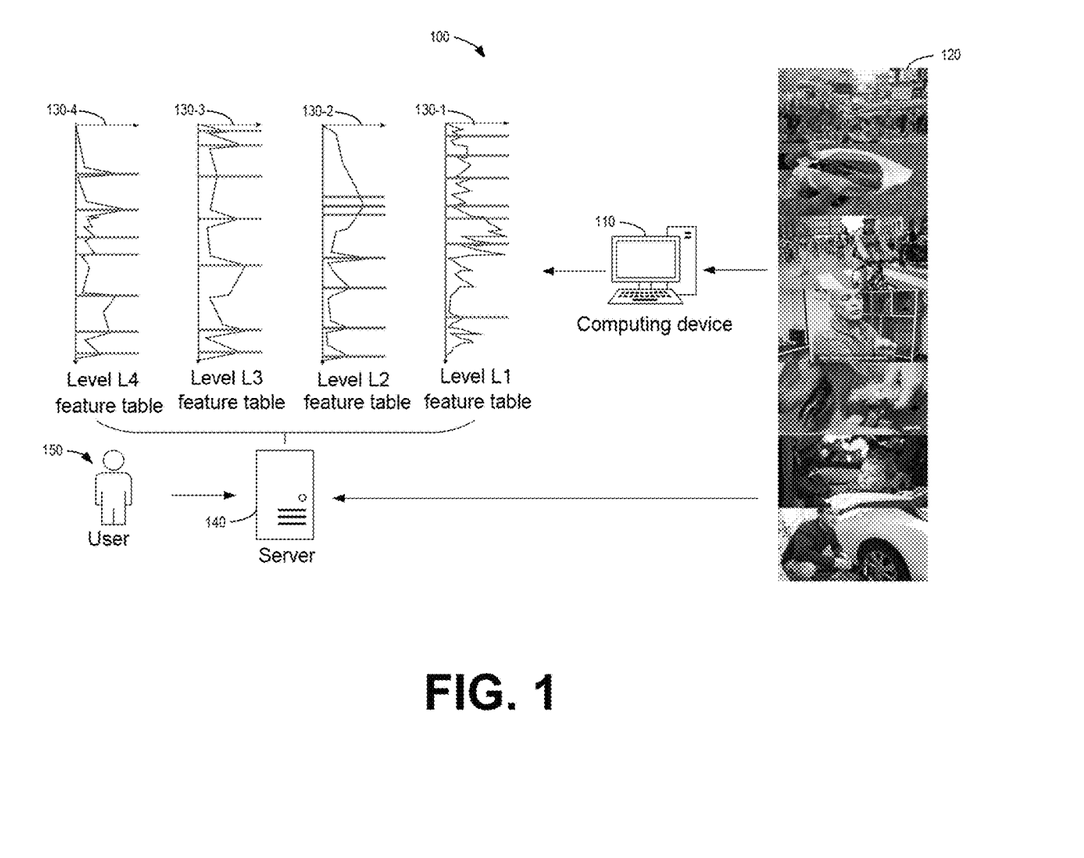
FIG. 1 illustrates a schematic diagram of an example environment in which embodiments of the present disclosure may be implemented.

FIG. 1 illustrates a schematic diagram of example environment 100 in which embodiments of the present disclosure may be implemented. As shown in FIG. 1, example environment 100 includes computing device 110 and server 140. Video 120 from user 150 can be input to computing device 110 and can also be stored in server 140. Video 120 is composed of multiple image frames arranged in an order. Computing device 110 can use some video processing applications to extract some specific frames in the video, which can also be called target frames or key frames. The key frame image or target frame image of video 120 can be a specified number of video frame images extracted by certain algorithms or rules from the sequence of image frames of a video.

In an embodiment shown by FIG. 1, computing device 110 may use machine learning to classify image frames in a video so as to identify feature information contained in the image frames and generate a feature table marking the video by the feature information. The generated feature table can include multiple different levels according to the number of the image frames. Therefore, as shown in FIG. 1, computing device 110 generates four feature tables, that is, 130-1, 130-2, 130-3, and 130-4 (which are collectively referred to as feature table 130). Feature table 130-1 is a level L1 feature table. Feature table 130-2 is a level L2 feature table. Feature table 130-3 is a level L3 feature table. Feature table 130-4 is a level L4 feature table. Feature table 130 may include distribution of features on all image frames of the entire video, and a chosen target frame, for example, may be multiple image frames with the highest number of features. For example, in feature table 130-1, seven image frames with the highest number of features are chosen. Since the number of image frames describing the video changes, at this time, the weights of different features may also change, so the distribution of features obtained may also be different. After generating feature table 130, computing device 110 may store feature table 130 in server 140, so that user 150 may use key words to retrieve the video in server 140.

Figure 2:
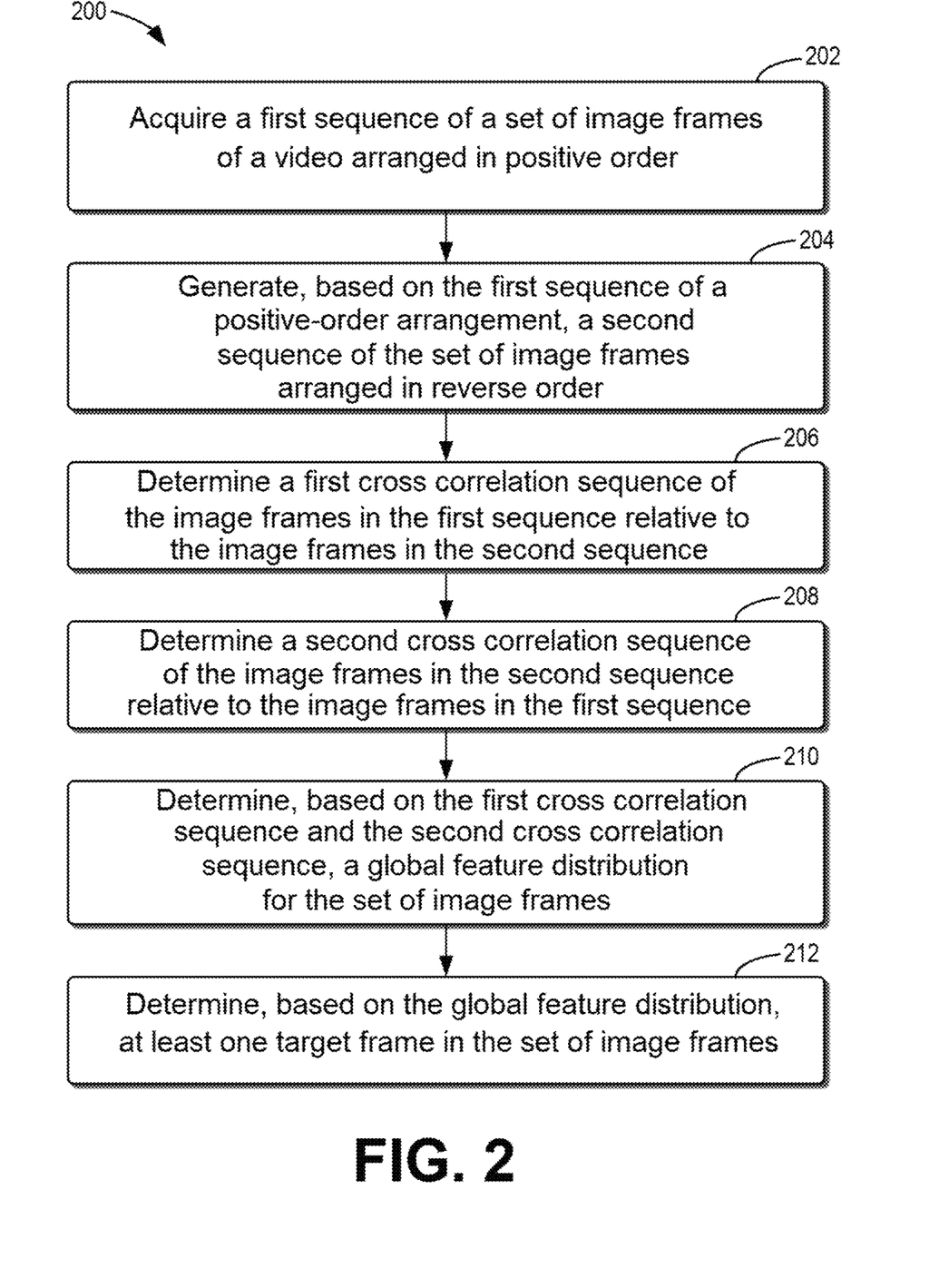
FIG. 2 shows a flow chart of an example method for extracting a target frame according to embodiments of the present disclosure.

FIG. 2 shows a flow chart of an example method for extracting a target frame according to embodiments of the present disclosure. Method 200 may be performed by, for example, computing device 110 in FIG. 1.

At 202, computing device 110 acquires a first sequence of a set of image frames of a video arranged in positive order. The image frames are arranged in positive order of time passing in the video. Therefore, in the first sequence, the image frames are also arranged in chronological order. Moreover, at 204, computing device 110 generates, based on the first sequence of a positive-order arrangement, a second sequence of the set of image frames arranged in reverse order.

At 206, computing device 110 determines a first cross correlation sequence of the image frames in the first sequence relative to the image frames arranged in reverse order in the second sequence. Here, the cross correlation can represent, for example, the similarity between feature information contained in one image frame and feature information contained in another image frame. For example, when the similarity of the feature information contained in two image frames is high, it means that the similarity of the scenes described by the two image frames is high, so the correlation between the two image frames is also high.

The first cross correlation sequence may include a similarity of each image frame in the first sequence relative to each image frame in the second sequence. For example, the similarity of a first image frame in the first sequence relative to each image frame in the second sequence can be organized sequentially as a cross similarity vector, and the cross similarity vector, as an element of the first cross correlation sequence, is arranged at a position corresponding to the first image frame. Hence, by performing this operation on each image frame in the first sequence, a first cross correlation sequence can be obtained, and the order of cross correlations in the first cross correlation sequence obtained is the same as that of corresponding image frames in the first sequence.

Similarly, at 208, computing device 110 determines a second cross correlation sequence of the image frames arranged in reverse order in the second sequence relative to the image frames arranged in positive order in the first sequence.

At 210, computing device 110 determines, based on the first cross correlation sequence and the second cross correlation sequence, a global feature distribution for the set of image frames. In some embodiments, computing device 110 can use the first cross correlation sequence and the second cross correlation sequence as weights to weight the original feature distribution of the first sequence so as to obtain the global feature distribution.

At 212, computing device 110 determines, based on the global feature distribution, at least one target frame in the set of image frames. In some embodiments, computing device 110 may choose multiple image frames with high feature distribution as target frames. By including the cross correlation of the positive order and the reverse order of image frames in the global feature distribution, the correlation of image frames that are far away in the video is taken into account, and the accuracy of the correlation is improved, so that the global feature distribution can more accurately describe the importance of the feature to the video. In this way, the feature information contained in the extracted target frame is improved to provide users with a more comprehensive video summary.

Figure 3:
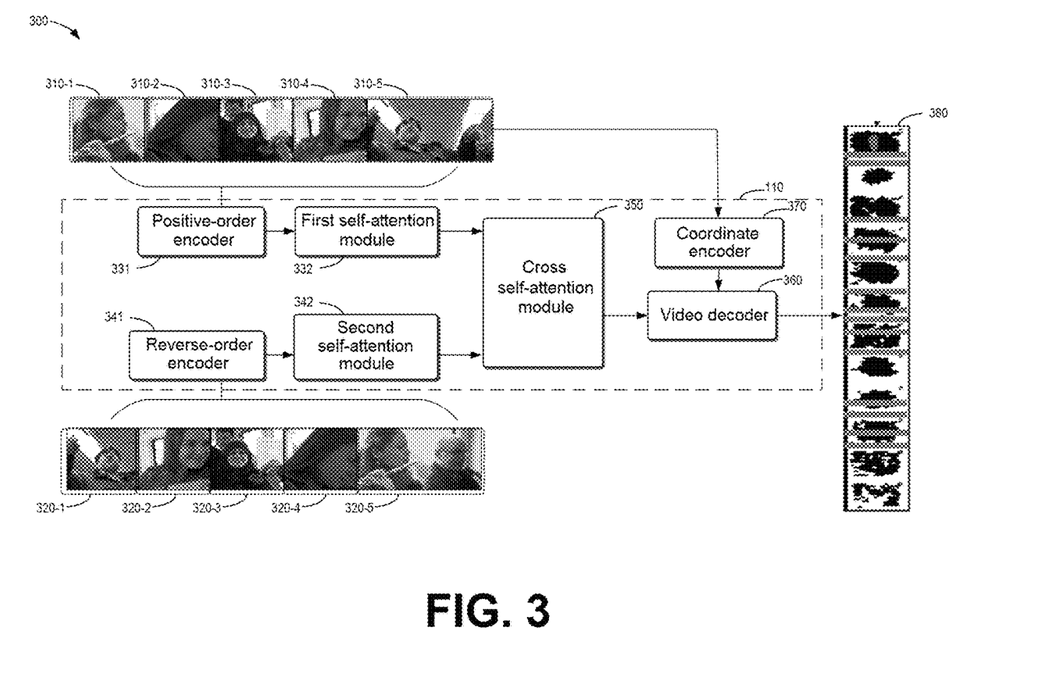
FIG. 3 shows a schematic diagram of an example process for extracting a target frame according to embodiments of the present disclosure.

FIG. 3 shows a schematic diagram of example process 300 for extracting a target frame according to embodiments of the present disclosure. Process 300 may be performed by, for example, computing device 110 in FIG. 1. As shown in FIG. 3, computing device 110 includes positive-order encoder 331 and first self-attention module 332. Positive-order encoder 331 may receive a first sequence of image frames of a video. The first sequence includes image frames 310-1, 310-2, 310-3, 310-4, and 310-5 arranged in chronological order. Positive-order encoder 331 may process image frames 310-1, 310-2, 310-3, 310-4, and 310-5 in the first sequence to generate corresponding feature vectors. Then, the generated feature vector is input to first self-attention module 332 so as to process the generated feature vectors by means of a self-attention mechanism. Similarly, computing device 110 further includes reverse-order encoder 341 and second self-attention module 342. Reverse-order encoder 341 may receive a second sequence of image frames of the video. The second sequence includes image frames 320-1, 320-2, 320-3, 320-4, and 320-5 arranged in a reverse chronological order. Reverse-order encoder 341 may process image frames 320-1, 320-2, 320-3, 320-4, and 320-5 in the second sequence so as to generate corresponding feature vectors. Then, the generated feature vector is input to second self-attention module 342 so as to process the generated feature vectors by means of a self-attention mechanism.

In some embodiments, first self-attention module 332 includes a self-attention model, and computing device 110 may process the first sequence by means of the self-attention model respectively so as to obtain a first query weight, a first bond weight, and a first value weight. Then, computing device 110 may weight feature vectors of image frames by using the first query weight, the first bond weight, and the first value weight, so as to respectively obtain a first set of query vectors, a first set of bond vectors, and a first set of value vectors. In some embodiments, after processing the first sequence with the self-attention model, computing device 110 can also obtain an internal correlation between the image frames in the first sequence and the feature distribution based on the internal correlation described by the following formula:

$$F_f = T\left(\frac{Q_I K_I^T}{\sqrt{D}}\right) V_I \quad (1)$$

where $F_f$ represents a local feature distribution of the first sequence, $Q_I$ represents a query vector of an image frame in video I, $K_I^T$ represents a bond vector of an image frame in video I, $V_I$ represents a value vector of an image frame in video I, T represents a Softmax calculation operation for normalization, and D represents a temperature of the feature vector of the image frame.

Similarly, second self-attention module 342 includes a self-attention model, and computing device 110 may process the second sequence by means of the self-attention model so as to obtain a second query weight, a second bond weight, and a second value weight. Then, computing device 110 may weight feature vectors of image frames by using the second query weight, the second bond weight, and the second value weight so as to respectively obtain a second set of query vectors, a second set of bond vectors, and a second set of value vectors. In some embodiments, after processing the second sequence with the self-attention model, computing device 110 can also obtain an internal correlation between the image frames in the second sequence and the feature distribution based on the internal correlation described by the following formula:

$$F_b = T\left(\frac{Q_{r(I)} K_{r(I)}^T}{\sqrt{D}}\right) V_{r(I)} \quad (2)$$

where $F_b$ represents a local feature distribution of the second sequence, $Q_{r(I)}$ represents a query vector of image frames in reverse video r(I) of video I, $K_{r(I)}^T$ represents a bond vector of image frames in reverse video r(I), $V_{r(I)}$ represents a value vector of image frames in reverse video r(I), T represents a Softmax calculation operation for normalization, and D represents a temperature of the feature vector of the image frame.

The self-attention model is a network model established based on simulating a human attention mechanism. The attention mechanism mimics an internal process of biological observation behaviors, that is, a mechanism that aligns internal experience with external perception to increase the observation precision of some regions. The attention mechanism can quickly extract important features of sparse data. Based on the attention mechanism, capturing a first image feature is based on a correlation of the attention of an image channel. The correlation can be an attention weight. By assigning the attention weight to a corresponding feature, a feature with the attention mechanism is obtained. Because the feature includes the correlation between multiple frames of a video, classification results or recommendation results will be more accurate, and the accuracy of video classification will be improved when using the feature for subsequent applications of scenes such as video classification and recommendation.

The attention mechanism model can be obtained by training with a large number of image frame training samples. Different feature classifications can be preset with different weights, so that the trained attention mechanism model adds weight attributes based on the correlation between image frames to the features of the input image frames, so as to obtain the weighted feature distribution, which improves the proportion of features with high attention. Therefore, when selecting target frames based on feature distribution, it can ensure that the selected target frame contains features with high attention.

After processing of the self-attention mechanism, the obtained first set of query vectors, first set of bond vectors, and first set of value vectors and the obtained second set of query vectors, second set of bond vectors, and second set of value vectors are input to cross self-attention module 350. Cross self-attention module 350 can process such input to obtain the global feature distribution. A process of calculating the global feature distribution will be described in detail with reference to FIGS. 4A and 4B.

Figure 4A:
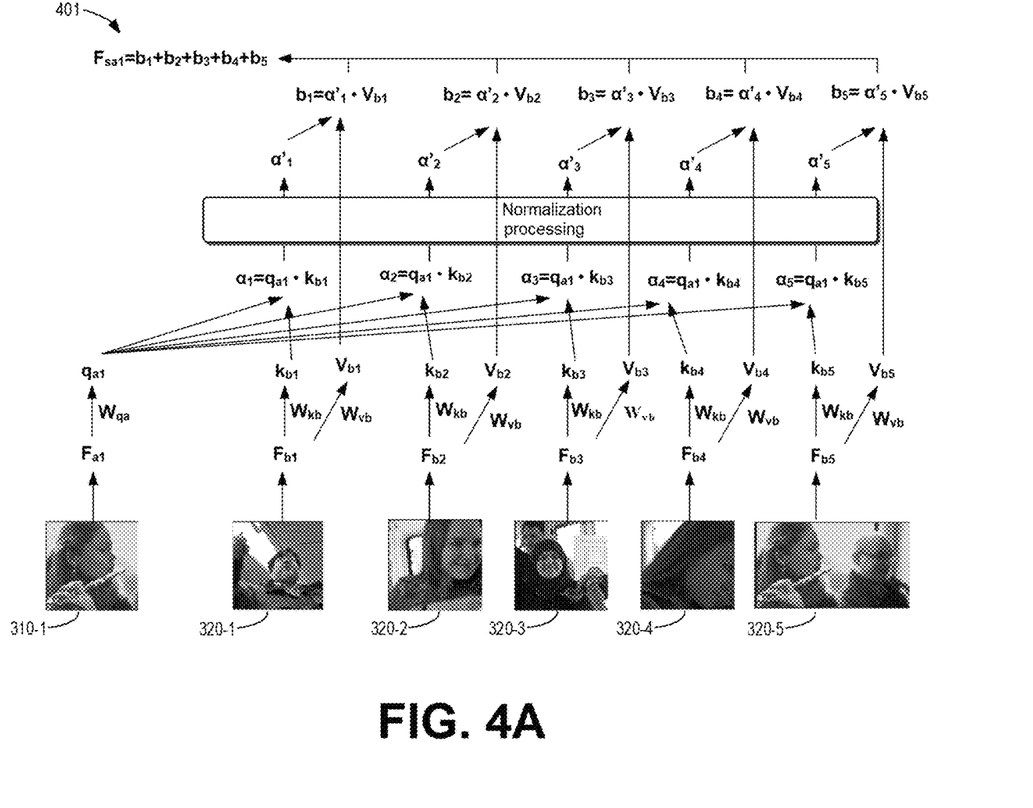
FIG. 4A and FIG. 4B show schematic diagrams of determining a cross correlation according to embodiments of the present disclosure.

FIG. 4A shows a schematic diagram of example process 401 of determining a cross correlation of the image frame 310-1 in the first sequence according to embodiments of the present disclosure. As shown in FIG. 4A, feature vector $F_{a1}$ is obtained after first image frame 310-1 in the first sequence is processed by positive-order encoder 331. Then, feature vector $F_{a1}$ is multiplied by first query weight $W_{qa}$ obtained by trained first self-attention module 332 to obtain first query vector $q_{a1}$. Feature vector $F_{b1}$ is obtained after first image frame 320-1 in the second sequence is processed by reverse-order encoder 341. Then, feature vector $F_{b1}$ is multiplied by second bond weight $W_{kb}$ obtained by trained second self-attention module 342 to obtain second bond vector $k_{b1}$. Similarly, $k_{b2}$, $k_{b3}$, $k_{b4}$, and $k_{b5}$ are respectively obtained after performing similar operations on image frames 320-2, 320-3, 320-4, and 320-5 in the second sequence. After that, dot product operations are performed on first query vector $q_{a1}$ and second bond vectors $k_{b1}$, $k_{b2}$, $k_{b3}$, $k_{b4}$, and $k_{b5}$ respectively to obtain cross correlations $\alpha_1$, $\alpha_2$, $\alpha_2$, $\alpha_3$, $\alpha_4$, and $\alpha_5$. After normalization is performed on cross correlations $\alpha_1$, $\alpha_2$, $\alpha_3$, $\alpha_4$, and $\alpha_5$, $\alpha'_1$, $\alpha'_2$, $\alpha'_3$, $\alpha'_4$, and $a'_5$ between 0 to 1 are obtained. The normalized cross correlations $\alpha'_1$, $\alpha'_2$, $\alpha'_3$, $\alpha'_4$, and $\alpha'_5$ are respectively multiplied with second value vectors $V_{b1}$, $V_{b2}$, $V_{b3}$, $V_{b4}$, and $V_{b5}$ of image frames 320-1, 320-2, 320-3, 320-4, and 320-5, so as to obtain feature vectors $b_1$, $b_2$, $b_3$, $b_4$, and $b_5$. Finally, feature vectors $b_1$, $b_2$, $b_3$, $b_4$, and $b_5$ are added to obtain weighted first feature vector $F_{sa1}$.

Figure 4B:
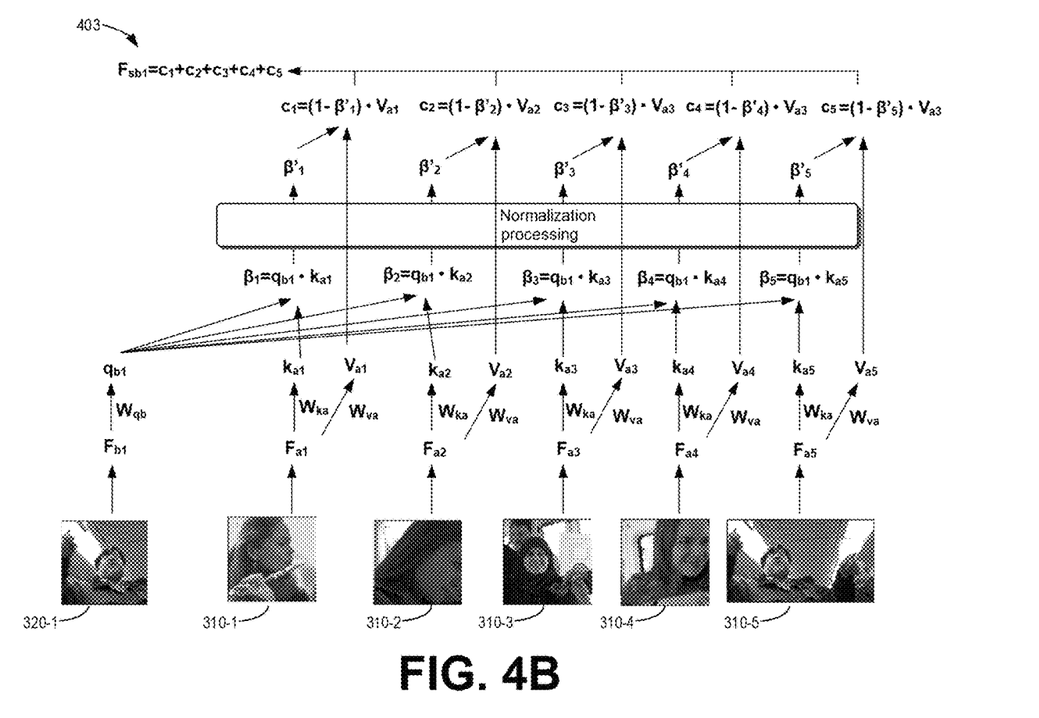

FIG. 4B shows a schematic diagram of example process 403 of determining a cross correlation of the image frame 320-1 in the first sequence according to embodiments of the present disclosure. As shown in FIG. 4B, after processing shown in FIG. 4A, feature vector $F_{b1}$ of first image frame 320-1 in the second sequence is obtained. Then, feature vector $F_{b1}$ is multiplied by second query weight $W_{qb}$ obtained by trained second self-attention module 342 to obtain second query vector $q_{b1}$. Similarly, $k_{a1}$, $k_{a2}$, $k_{a3}$, $k_{a4}$, and $k_{a5}$ are respectively obtained after performing similar operations on image frames 310-1, 310-2, 310-3, 310-4, and 310-5 in the first sequence. After that, dot product operations are performed on second query vector qui and first bond vectors $k_{a1}$, $k_{a2}$, $k_{a3}$, $k_{a4}$, and $k_{a5}$ respectively to obtain cross correlations $\beta_1$, $\beta_2$, $\beta_3$, $\beta_4$, and $\beta_5$. After normalization is performed on cross correlations $\beta_1$, $\beta_2$, $\beta_3$, $\beta_4$, and $\beta_5$, $\beta'_1$, $\beta'_2$, $\beta'_3$, $\beta'_4$, and $\beta'_5$ between 0 to 1 are obtained. Compensations $1-\beta'_1$, $1-\beta'_2$, $1-\beta'_3$, $1-\beta'_4$, and $1-\beta'_5$ of the normalized cross correlations are respectively multiplied by first value vectors $V_{a1}$, $V_{a2}$, $V_{a3}$, $V_{a4}$, and $V_{a5}$ of image frames 310-1, 310-2, 310-3, 310-4, and 310-5 so as to obtain feature vectors $c_1$, $c_2$, $c_3$, $c_4$, and $c_5$. Finally, feature vectors $c_1$, $c_2$, $c_3$, $c_4$, and $c_5$ are added to obtain weighted second feature vector $F_{sb1}$.

Returning to FIG. 3, after first feature vector $F_{sa1}$ and second feature vector $F_{sb1}$ are obtained, they are added to obtain a weighted global feature vector of first image frame 310-1. After global feature vectors of all image frames are obtained and processed, a global feature distribution is obtained, and the global feature distribution is calculated, for example, by the following formula:

$$F_S = T\left(\frac{Q_{F_f} K_{F_b}^T}{\sqrt{D}}\right) V_{F_b} + \left(1 - T\left(\frac{Q_{F_b} K_{F_f}^T}{\sqrt{D}}\right)\right) V_{F_f} \qquad (3)$$

where $F_S$ is the global feature distribution, that is, a matrix of a global feature vector of each image frame, $Q_{F_f}$ represents query vectors of the first sequence arranged in positive order, $K_{F_b}^T$ represents a bond vector of the second sequence arranged in reverse order, $V_{F_b}$ represents a value vector of the second sequence, $Q_{F_b}$ represents a query vector of the second sequence, $K_{F_f}^T$ represents a bond vector of the first sequence, and $V_{F_f}$ represents a value vector of the first sequence. Alternatively, as a simplification, it can also be calculated, for example, by the following formula:

$$F_S = T\left(\frac{Q_{F_f} K_{F_b}^T}{\sqrt{D}}\right) V_{F_b} + \left(1 - T\left(\frac{Q_{F_f} K_{F_b}^T}{\sqrt{D}}\right)\right) V_{F_f} \qquad (4)$$

At this time, the global feature distribution and corresponding position information generated via coordinate encoder 370, that is, the coordinates of each video frame, are input into video decoder 360, and then the operation of extracting a target frame can be performed to extract the target frame based on feature distribution 380. A process of extracting the target frame based on the global feature distribution is similarly described with reference to FIG. 5 below.

Figure 5:
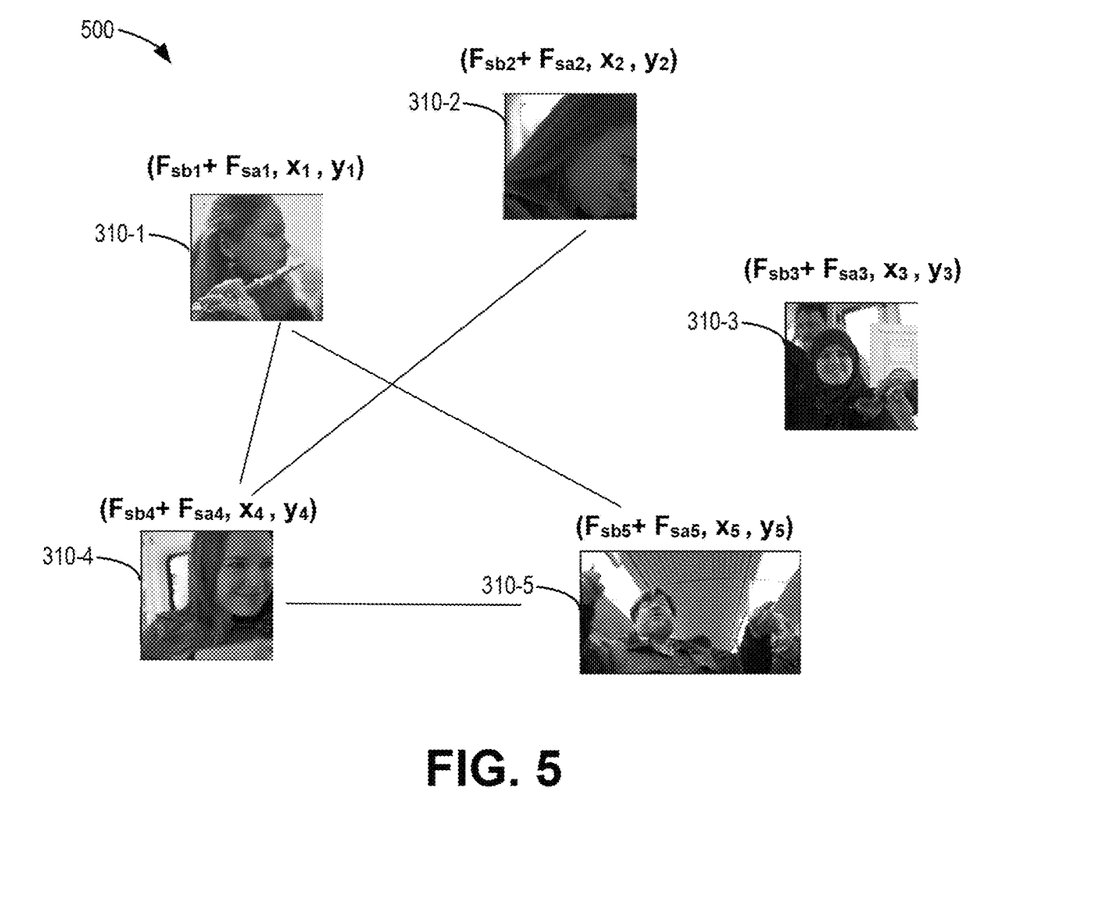
FIG. 5 shows a schematic diagram of a connection relationship of an image frame in a space according to embodiments of the present disclosure.

FIG. 5 shows a schematic diagram of distribution 500 of an image frame in a space according to embodiments of the present disclosure. In some embodiments, computing device 110 may expand the numbers of image frames in a first sequence to multi-dimensional coordinates using coordinate encoder 370. For example, computing device 110 can expand the numbers to two-dimensional coordinates by using the following formula:

$$p = [\sin(2^n \pi \times i), \cos(2^n \pi \times i)] \qquad (5)$$

where n represents an order, and i represents a number. The first item of the generated two-dimensional coordinates can be regarded as the coordinates of the X axis, and the second item can be the coordinates of the Y axis. Therefore, an image frame can be projected into an appropriate space by using the generated two-dimensional coordinates and space changes, for example, by inputting the generated coordinates and the global feature distribution into a multilayer perceptron (MLP):

$$F_i = MLP(F_s^i; p^i) \qquad (6)$$

As shown in FIG. 5, image frames 310-1, 310-2, 310-3, 310-4, and 310-5 in the first sequence are distributed in the space according to generated coordinates. Then, a generated set $F_i$ is input to an edge convolution graph neural network for predicting a connection relationship between each image frame, so as to choose a target frame based on the connection relationship. For example, when the correlation between image frames is high, image frames are connected. Therefore, the more connections between an image frame and other image frames, the higher the correlation between the image frame and other image frames, which contains more feature information, and is suitable for being selected as a target frame.

In the embodiment shown in FIG. 5, since image frame 310-1, image frame 310-4, and image frame 310-5 all contain features of playing music, image frame 310-1, image frame 310-4, and image frame 310-5 are connected with each other. Image frame 310-2 and image frame 310-4 both contain features of the same person, therefore, image frame 310-2 and image frame 310-4 are connected with each other. As shown in FIG. 5, image frame 310-4 and the other three image frames are connected to other remaining image frames. Therefore, if only one image frame is chosen as the target frame, image frame 310-4 will be chosen. If three image frames are selected as target frames, image frame 310-1 and image frame 310-5 are respectively connected with two other image frames, and therefore, are also selected as target frames. The process can be represented by the following formula:

$$c_i = \text{Sigmoid}(MLP(GNN(F_i))) \quad (7)$$

where $c_i$ represents a score associated with the number of connections of the ith image frame, GNN represents an edge convolution graph neural network operation, MLP represents adjustment of the number of inputs and outputs, and Sigmoid represents a Sigmoid function.

Figure 6:
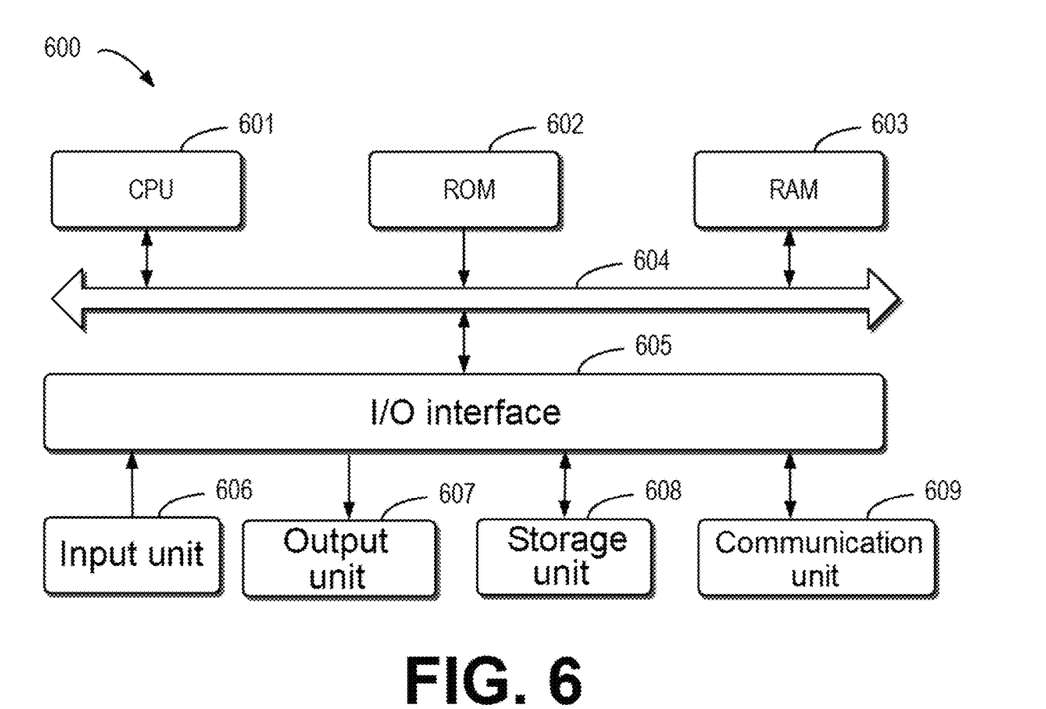
FIG. 6 is a block diagram of an example device that can be used for implementing embodiments of the present disclosure.

FIG. 6 is a schematic block diagram of example device 600 that can be used to implement embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. When the computer program is loaded to RAM 603 and executed by CPU 601, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated improvements, so as to enable persons of ordinary skill in the art to understand the embodiments disclosed herein.

What is claimed is:

1. A method for extracting a target frame, comprising:
   acquiring a first sequence of a set of image frames of a video arranged in positive order;
   generating, based on the first sequence of a positive-order arrangement, a second sequence of the set of image frames arranged in reverse order;
   determining a first cross correlation sequence of the image frames in the first sequence relative to the image frames in the second sequence;
   determining a second cross correlation sequence of the image frames in the second sequence relative to the image frames in the first sequence;
   determining, based on the first cross correlation sequence and the second cross correlation sequence, a global feature distribution for the set of image frames; and
   determining, based on the global feature distribution, at least one target frame in the set of image frames.

2. The method according to claim 1, wherein determining the first cross correlation sequence comprises:
   determining a first set of query vectors, a first set of bond vectors, and a first set of value vectors that are associated with feature vectors of the image frames in the first sequence;
   determining a second set of query vectors, a second set of bond vectors, and a second set of value vectors that are associated with the image frames in the second sequence; and
   determining the first cross correlation sequence based on the first set of query vectors and the second set of bond vectors.

3. The method according to claim 2, wherein determining the second cross correlation sequence comprises:
   determining the second cross correlation sequence based on the second set of query vectors and the first set of bond vectors.

4. The method according to claim 3, wherein determining the global feature distribution comprises:
   determining the global feature distribution based on the first cross correlation sequence, the first set of value vectors, the second cross correlation sequence, and the second set of value vectors.

5. The method according to claim 2, wherein determining the first set of query vectors, the first set of bond vectors, and the first set of value vectors comprises:
   processing the first sequence by means of a self-attention model to obtain a first query weight, a first bond weight, and a first value weight; and
   determining the first set of query vectors, the first set of bond vectors, and the first set of value vectors based on the first query weight, the first bond weight, the first value weight, and a first set of feature vectors for the first sequence.

6. The method according to claim 2, wherein determining the second set of query vectors, the second set of bond vectors, and the second set of value vectors comprises:
   processing the second sequence by means of a self-attention model to obtain a second query weight, a second bond weight, and a second value weight; and
   determining the second set of query vectors, the second set of bond vectors, and the second set of value vectors based on the second query weight, the second bond weight, the second value weight, and a second set of feature vectors for the second sequence.

7. The method according to claim 1, wherein determining the at least one target frame comprises:
   determining, based on a serial number of one image frame in the set of image frames in the first sequence, coordinates of the one image frame in a space;
   mapping the set of image frames to the space based on the coordinates;
   determining, based on the global feature distribution, a connection relationship of the set of image frames in the space; and
   determining an image frame whose number of connections with other image frames is greater than a threshold number of connections as the at least one target frame.

8. The method according to claim 7, wherein determining the coordinates comprises:
   expanding the serial number to two-dimensional coordinates.

9. The method according to claim 7, wherein determining the connection relationship comprises:
   determining the connection relationship between image frames in the set of image frames based on the global feature distribution and the coordinates according to an edge convolution graph neural network.

10. An electronic device, comprising:
    a processor; and
    a memory coupled to the processor, the memory having instructions stored therein, wherein the instructions, when executed by the processor, cause the electronic device to perform actions comprising:
    acquiring a first sequence of a set of image frames of a video arranged in positive order;
    generating, based on the first sequence of a positive-order arrangement, a second sequence of the set of image frames arranged in reverse order;
    determining a first cross correlation sequence of the image frames arranged in positive order in the first sequence relative to the image frames arranged in reverse order in the second sequence;
    determining a second cross correlation sequence of the image frames arranged in reverse order in the second sequence relative to the image frames arranged in positive order in the first sequence;
    determining, based on the first cross correlation sequence and the second cross correlation sequence, a global feature distribution for the set of image frames; and
    determining, based on the global feature distribution, at least one target frame in the set of image frames.

11. The electronic device according to claim 10, wherein determining the first cross correlation sequence comprises:
    determining a first set of query vectors, a first set of bond vectors, and a first set of value vectors that are associated with feature vectors of the image frames in the first sequence;
    determining a second set of query vectors, a second set of bond vectors, and a second set of value vectors that are associated with the image frames in the second sequence; and
    determining the first cross correlation sequence based on the first set of query vectors and the second set of bond vectors.

12. The electronic device according to claim 11, wherein determining the second cross correlation sequence comprises:
    determining the second cross correlation sequence based on the second set of query vectors and the first set of bond vectors.

13. The electronic device according to claim 12, wherein determining the global feature distribution comprises:
    determining the global feature distribution based on the first cross correlation sequence, the first set of value vectors, the second cross correlation sequence, and the second set of value vectors.

14. The electronic device according to claim 11, wherein determining the first set of query vectors, the first set of bond vectors, and the first set of value vectors comprises:
    processing the first sequence by means of a self-attention model to obtain a first query weight, a first bond weight, and a first value weight; and
    determining the first set of query vectors, the first set of bond vectors, and the first set of value vectors based on the first query weight, the first bond weight, the first value weight, and a first set of feature vectors for the first sequence.

15. The electronic device according to claim 11, wherein determining the second set of query vectors, the second set of bond vectors, and the second set of value vectors comprises:
    processing the second sequence by means of a self-attention model to obtain a second query weight, a second bond weight, and a second value weight; and
    determining the second set of query vectors, the second set of bond vectors, and the second set of value vectors based on the second query weight, the second bond weight, the second value weight, and a second set of feature vectors for the second sequence.

16. The electronic device according to claim 10, wherein determining the at least one target frame comprises:
    determining, based on a serial number of one image frame in the set of image frames in the first sequence, coordinates of the one image frame in a space;
    mapping the set of image frames to the space based on the coordinates;
    determining, based on the global feature distribution, a connection relationship of the set of image frames in the space; and
    determining an image frame whose number of connections with other image frames is greater than a threshold number of connections as the at least one target frame.

17. The electronic device according to claim 16, wherein determining the coordinates comprises:
    expanding the serial number to two-dimensional coordinates.

18. The electronic device according to claim 16, wherein determining the connection relationship comprises:
    determining the connection relationship between image frames in the set of image frames based on the global feature distribution and the coordinates according to an edge convolution graph neural network.

19. A computer program product, the computer program product being tangibly stored on a non-transitory computer-readable medium and comprising machine-executable instructions, wherein the machine-executable instructions, when executed by a machine, cause the machine to:

acquire a first sequence of a set of image frames of a video arranged in positive order;

generate, based on the first sequence of a positive-order arrangement, a second sequence of the set of image frames arranged in reverse order;

determine a first cross correlation sequence of the image frames arranged in positive order in the first sequence relative to the image frames arranged in reverse order in the second sequence;

determine a second cross correlation sequence of the image frames arranged in reverse order in the second sequence relative to the image frames arranged in positive order in the first sequence;

determine, based on the first cross correlation sequence and the second cross correlation sequence, a global feature distribution for the set of image frames; and determine, based on the global feature distribution, at least one target frame in the set of image frames.

20. The computer program product according to claim 19, wherein determining the first cross correlation sequence comprises:

determining a first set of query vectors, a first set of bond vectors, and a first set of value vectors that are associated with feature vectors of the image frames in the first sequence;

determining a second set of query vectors, a second set of bond vectors, and a second set of value vectors that are associated with the image frames in the second sequence; and determining the first cross correlation sequence based on the first set of query vectors and the second set of bond vectors.

* * * * *